United States Patent
Inoue et al.

(10) Patent No.: US 7,502,859 B2
(45) Date of Patent: Mar. 10, 2009

(54) DYNAMIC RESOURCE MANAGEMENT FOR DISTRIBUTED RETRIEVAL SYSTEM FOR SECURITY

(75) Inventors: Shuji Inoue, Kanagawa (JP); Kuo Chu Lee, Princeton Junction, NJ (US); Hasan Timucin Ozdemir, Plainsboro, NJ (US)

(73) Assignee: Panasonic Corporation, Osaka (JP)

(*) Notice: Subject to any disclaimer, the term of this patent is extended or adjusted under 35 U.S.C. 154(b) by 756 days.

(21) Appl. No.: 10/665,772

(22) Filed: Sep. 19, 2003

(65) Prior Publication Data

US 2005/0066331 A1 Mar. 24, 2005

(51) Int. Cl.
G06F 15/173 (2006.01)
G06F 15/16 (2006.01)
G06F 11/00 (2006.01)
G06F 3/00 (2006.01)
H04H 60/33 (2008.01)

(52) U.S. Cl. .................. 709/226; 709/203; 702/188; 710/5; 725/10

(58) Field of Classification Search ............... 709/223, 709/224, 226; 702/188; 710/5; 725/10
See application file for complete search history.

(56) References Cited

U.S. PATENT DOCUMENTS

| | | | |
|---|---|---|---|
| 4,932,958 A | 6/1990 | Reddy et al. | |
| 5,609,583 A | 3/1997 | Hakki et al. | |
| 5,785,641 A | 7/1998 | Davis | |
| 5,964,732 A | 10/1999 | Willard | |
| 5,971,967 A | 10/1999 | Willard | |
| 6,004,290 A | 12/1999 | Davis | |
| 6,094,680 A | 7/2000 | Hokanson | |
| 6,119,143 A | 9/2000 | Dias et al. | |
| 6,128,644 A * | 10/2000 | Nozaki ................. | 709/203 |
| 6,167,427 A | 12/2000 | Rabinovich et al. | |
| 6,202,080 B1 | 3/2001 | Lu et al. | |
| 6,221,060 B1 | 4/2001 | Willard | |
| 6,258,060 B1 | 7/2001 | Willard | |
| 6,263,368 B1 | 7/2001 | Martin | |
| 6,304,967 B1 | 10/2001 | Braddy | |
| 6,330,621 B1 * | 12/2001 | Bakke et al. ........... | 710/5 |

(Continued)

FOREIGN PATENT DOCUMENTS

WO    WO 9602210    6/1995

(Continued)

OTHER PUBLICATIONS

"The Globus Project: A Status Report", Ian Foster, et al., Proc. IPPS/SPDP 98 Heterogeous Computing Workshop, pp. 4-48, 1998.

Primary Examiner—Joseph E Avellino
Assistant Examiner—Jeong S Park
(74) Attorney, Agent, or Firm—Harness, Dickey & Pierce, PLC

(57) ABSTRACT

A resource manager allocates operation requests to security network devices according to device characteristics. The devices collect and/or manage data from an environment. The devices may include a camera, a multimedia recorder, an analyzer, and a meta-data server. One or more users submit operation requests to a controller. The controller allocates the network devices to the operation requests according to the device characteristics. The device characteristics include availability of the device, media flow data of the device, location of the device, and capabilities of the device.

41 Claims, 3 Drawing Sheets

U.S. PATENT DOCUMENTS

| | | | |
|---|---|---|---|
| 6,463,454 B1 | 10/2002 | Lumelsky et al. | |
| 6,480,861 B1 | 11/2002 | Kanevsky et al. | |
| 6,516,350 B1 | 2/2003 | Lumelsky et al. | |
| 6,523,065 B1 | 2/2003 | Combs et al. | |
| 6,527,702 B2 | 3/2003 | Whalen et al. | |
| 6,551,304 B1 | 4/2003 | Whalen et al. | |
| 6,719,709 B2 | 4/2004 | Whalen et al. | |
| 2001/0034586 A1* | 10/2001 | Ewert et al. | 702/188 |
| 2002/0065476 A1 | 5/2002 | Whalen et al. | |
| 2002/0198506 A1 | 12/2002 | Whalen et al. | |
| 2003/0078467 A1 | 4/2003 | Whalen et al. | |
| 2003/0153807 A1 | 8/2003 | Whalen et al. | |
| 2003/0208183 A1 | 11/2003 | Whalen et al. | |
| 2004/0015155 A1 | 1/2004 | Whalen et al. | |

FOREIGN PATENT DOCUMENTS

WO     WO 03039334     5/2003

* cited by examiner

US 7,502,859 B2

DYNAMIC RESOURCE MANAGEMENT FOR DISTRIBUTED RETRIEVAL SYSTEM FOR SECURITY

FIELD OF THE INVENTION

The present invention relates to distributed architecture networks, and more particularly to resource management of a distributed architecture networked security system.

BACKGROUND OF THE INVENTION

In a distributed security system, various devices may be distributed on multiple networks. The components may be remotely located from each other or from a centralized controller. For example, cameras, monitors, recorder servers, meta-data servers, and archive servers may be attached to different networks. Often, the remotely-located components communicate wirelessly. For example, a network may use IP-based (Internet protocol) distributed architecture. The controller coordinates operations of the remotely located components. The security system activates recording or live analysis operations when a security event, such as motion, is detected. Because security events are not predetermined, conflicts may arise between various devices due to load and availability limitations.

It is therefore desirable to distribute the load on the devices according to various operations. The present invention uses a centralized controller to distribute operations to the devices according to load, availability, capacity, priority, and device capabilities.

SUMMARY OF THE INVENTION

A resource manager for a security system comprises one or more devices for collecting and/or managing data from an environment. One or more users submit operation requests for the data. A controller receives the requests and determines load characteristics of the devices. The controller allocates the devices to the operation requests according to the load characteristics.

In another embodiment of the invention, a resource manager for a security system network comprises a camera that collects multimedia data, a multimedia recorder that stores the multimedia data, and an analyzer that extracts meta-data from the multimedia data. One or more users submit operation requests for the data. A controller receives the operation requests and communicates with the camera, the multimedia recorder, and the analyzer to determine load characteristics. The controller allocates the operation requests according to the load characteristics.

In another embodiment of the invention, a method for allocating resources in a security system network comprises collecting data from an environment at one or more network resources. Requests are submitted for the data. Load characteristics of the network resources are determined at a controller. The network resources are allocated to the requests according to the load characteristics.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
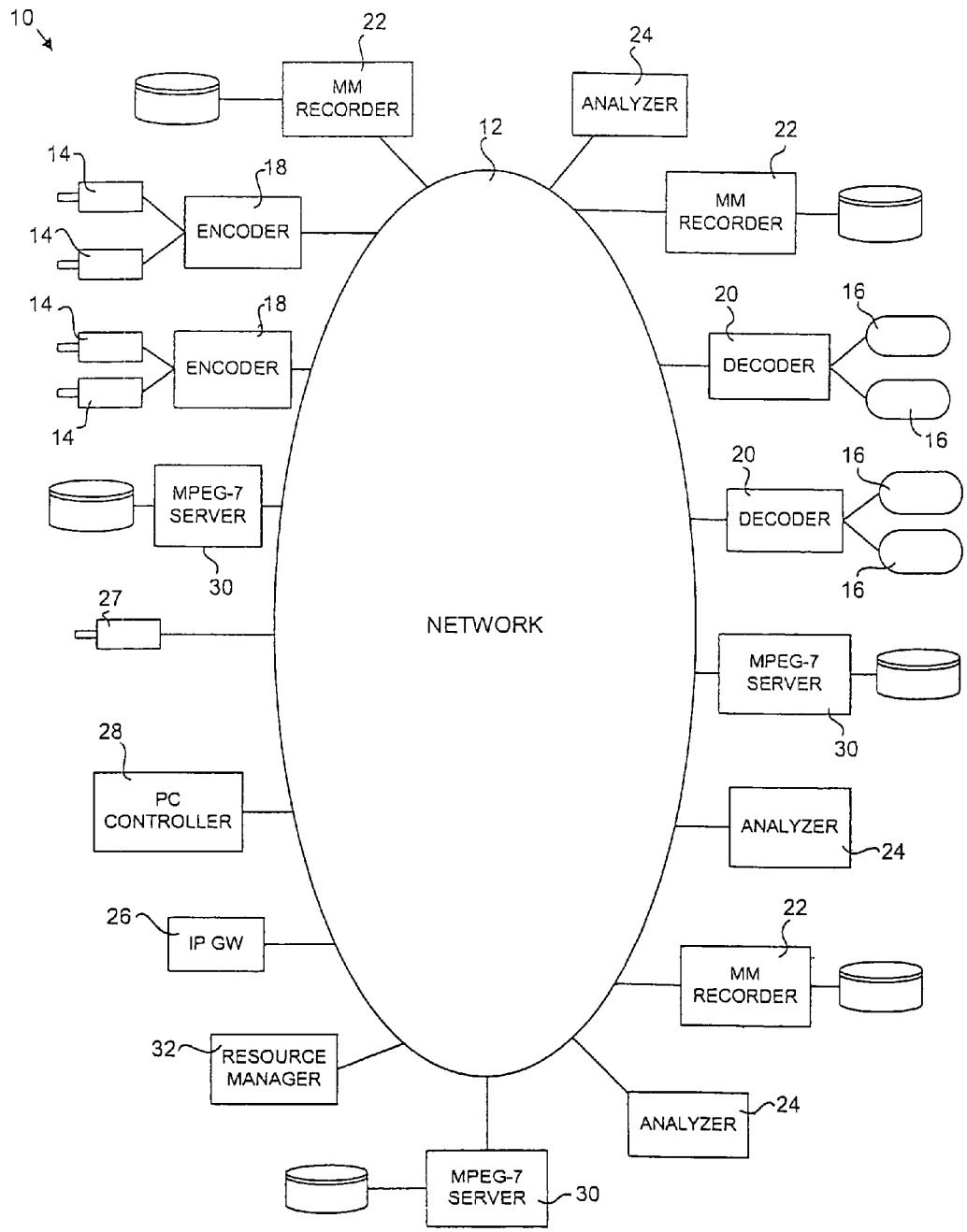
FIG. 1 is a functional block diagram of a distributed security system architecture according to the present invention.

A distributed security network 10 includes an IP network controller 12 as shown in FIG. 1. The IP network controller 12 communicates with one or more devices, including cameras 14, monitors 16, encoders 18, decoders 20, a multimedia recorder 22, an analyzer 24, an IP gateway 26, an IP camera 27, and a PC controller 28.

The cameras 14 collect image data from an environment. The encoders 18 connect the cameras 14 to the IP network controller 12. The monitors 16 display the image data obtained from the cameras 14 in real-time. The decoders 20 connect the monitors 16 to the IP network controller 12. The multimedia recorder 22 records and archives the image data collected by the cameras 14. The multimedia recorder 22 plays the archived image data on the monitors 16 upon receiving a playback request. The playback operation is controlled by the user or analyzer unit 24.

The analyzer 24 analyzes the image data to extract meta-data. Meta-data includes the content, quality, and other characteristics of data. In the present invention, the meta-data may indicate security-related anomalies in the image data. One possible format of meta-data is MPEG-7. The analyzer 24 may analyze the image data in real-time or analyze recorded image data archived by the multimedia recorder 22. The analyzer 24 produces an alarm if an anomaly is detected in the image data. The PC controller 28 controls configuration characteristics of each device as well as the operations of each device.

Additionally, the security network 10 includes a meta-data server 30. The meta-data server 30 stores the meta-data associated with the archived image data. An initial meta-data entry includes, but is not limited to, recording purpose, date, time, and camera. The initial meta-data entry is created after the multimedia recorder 22 completes the recording of a multimedia stream from the cameras 14. Additionally, the analyzer 24 may extract further information from the archived image data and update the meta-data entry in the meta data server 30. A user submits a query to retrieve meta-data from the meta-data server 30. The query returns location information for the requested archived image data. The location information includes a file descriptor and the corresponding multimedia recorder. The user then retrieves the archived image data from the multimedia recorder based on the location information. If the user accesses the security network 10 through the Internet, the user connects to the network 10 through the IP gateway 26. The IP gateway 26 connects the user to the proper source according to the operation. For example, if the operating requires retrieval of the real-time image data from a camera, the IP gateway 26 obtains the real-time image data of the camera and relays the media from the security network to the internet user's terminal.

A resource manager 32 allocates networked devices to the requested operations. The resource manager 32 manages the multimedia recorder units 22, the meta-data server units 30, and the analyzer units 24. Load on each unit is defined based on its functions in the security system. For example, the load of the multimedia recorder 22 is defined by available network bandwidth, available disk space, and available concurrency for the device. The number of concurrency denotes the number of concurrent operations on the device. For example, the multimedia recorder 22 may be able to handle a maximum of five simultaneous recording and playback operations. The load of the meta-data server unit 30 is defined by the available concurrency and available disk space. The load of the analyzer server unit 24 is defined by the available bandwidth and available number of concurrency parameters. For each device, the PC controller 28 obtains the maximum value for each parameter during the device registration and informs the resource manager 32 about the availability and capabilities of each device. For example, the multimedia recorder 22 specifies its maximum network bandwidth, maximum concurrency, and maximum disk space information when the device is registered to the PC controller unit 28.

The resource manager 32 assigns networked resources to the operations requested by the PC controller unit 28. The resource manager 32 considers current resource availability, the resource requirement of the current operation request, and near future resource requests in determining how to allocate resources. The ability to consider near future requests allows the resource manager 32 to forecast the load on networks and devices in the near future. The PC controller 28 directs the devices that are selected by the resource manager 32 to perform operations.

Figure 2:
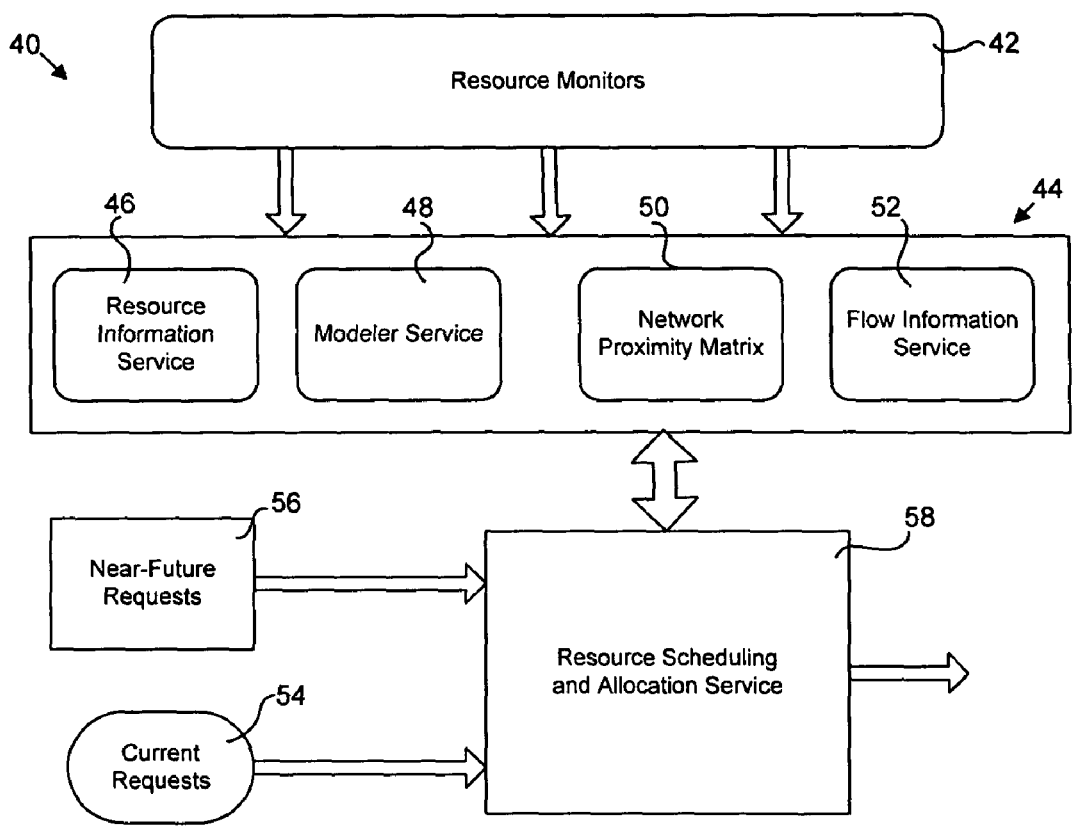
FIG. 2 is a functional block diagram of a resource manager according to the present invention.

The resource manager architecture 40 is shown in FIG. 2. The resource manager 32 includes resource monitors 42 and a resource knowledge base 44. The resource knowledge base 44 includes a resource information service 46, a modeler service 48, a network proximity matrix 50, and a flow information service 52. The resource monitors 42 monitor the devices and network resources and update the resource knowledge base 44 with the information. For example, the resource monitors 42 may collect network bandwidth usage information to reflect current traffic load on the network and update an entry associated with the monitored network in the modeler service 48. Devices provide their load information periodically. For example, a multimedia recorder unit 22 provides the available bandwidth, average CPU utilization, and available disk space information periodically. In one embodiment, this information is included in a device keep-alive message, which is sent periodically, to reduce message traffic in the system.

Still referring to FIG. 2, the resource manager 32 performs resource scheduling and allocation in response to a current request 54 according to near future requests 56 and current load on the managed devices. Requests may include a recording request, a live analysis request, an archive analysis request, a playback request, a play request, or a search request. The requests are triggered by alarms, triggered automatically according to a periodic schedule, or submitted by a system user.

The resource manager 32 allocates: multimedia recorder units 22 for recording or playback; meta-data server units 30 for searches; analyzer units 24 for live media analysis; analyzer units 24 and multimedia units 22 for archive data analysis; and multicast addresses for cameras 14. The resource manager 32 selects candidate devices based on the requested operation, the resource requirement of the requested operation, and the current load on the device and networks. In another embodiment, the size of a candidate set is limited so that only the first n devices are considered. The resource manager 32 evaluates each candidate device based on the requested operation, the resource requirement of the requested operation, the current load on the device and networks, and the known future operation requests. The future operation requests are obtained from known periodic scheduled operations in the PC controller 28. During this evaluation phase, candidate devices will receive a score that defines order of preference between candidates. Then, the resource manager 32 communicates with the devices to reserve the operation on the selected device until one of the candidates accepts the operation, the candidate set is exhausted, or the operation times out. The resource manager 32 communicates with the devices sequentially based on an order defined by the scores. After a successful reservation, the resource manager 32 returns the selected device or devices as a response to the resource request. In another embodiment, the resource manager 32 directly sends the message to start the desired operation to prevent the reservation step. The resource manager keeps track of various load information associated with devices and networks that are described in the following sections.

The resource manager 32 builds the candidate devices set based on the requested operation type. In case of recording, playback, and live analysis operation, an element of the candidate set includes only one device. In case of archive analysis operation, an element of the candidate set includes two devices, namely the multimedia recorder 22, which will playback the archive media file, and the analyzer server 24, which will analyze the archived media file.

The resource information service 46 stores availability, current resource usage, maximum capacity, and current operations information for each device. When the device is unregistered from the security system, the resource manager 32 moves the device to an unavailable state in the resource information service 46. When a resource allocation is completed, the resource manager 32 updates the entry associated with the device in the resource information service 46. For example, the resource manager 32 adds the information about the new operation, reduces the available bandwidth based on the operation, and updates concurrency values associated with the device. When an operation concludes on a device, the resource manager 32 updates the entry associated with the device in the resource information service 46 by removing the finished operation and updating the current resource usage information.

For each multimedia recorder 22, the resource information service 46 stores capacity information, including but not limited to maximum bandwidth, maximum disk space, maximum number of concurrent recording and playback operations, overwrite capabilities, and trans-coding capabilities. Overwrite capabilities are significant in the event that the hard disk is full. Trans-coding capabilities refer to the ability to convert between multiple media formats. The resource information service 46 stores the available bandwidth, available disk space, the available concurrency, average CPU utilization, and a record of each active operation in the multimedia recorder 22. The record of an active operation contains recording or playback operation details. The data related to recording operation contains a media source identifier, such as a camera identifier, the recording format, source media format, source media multicast address, source media bandwidth requirement, priority of operation, the operation start time, and optional operation duration. The data related to playback operation contains the archive file identifier, playback media format, playback media bandwidth requirement, priority of operation, the operation start time, and receiving analyzer server, IP gateway, or user terminal information. When the multimedia recorder 22 has no disk space and the overwrite policy of multimedia recorder 22 is set to "not-to-overwrite", then the multimedia recorder 22 is not selected as a candidate device for recording operations. When the multimedia recorder 22 cannot have the proper trans-coding capability, then the multimedia recorder 22 is not selected for playback or recording even though the multimedia recorder has enough bandwidth and concurrency.

The resource information service 46 stores the following capacity information for each analyzer server 24: maximum bandwidth, maximum number of concurrent live and archive analysis operations, and available capabilities. The resource information service 46 stores the available bandwidth, the available concurrency, average CPU utilization, and record for each active operation in the analyzer 24. The record of active operation contains live or archive analysis operation details. The data related to live analysis operation contains media source identifier, source media format, source media multicast address, source media bandwidth requirement, priority of operation, the operation start time, and optional operation duration. The data related to archive analysis operation contains the archived file identifier, multimedia recorder 22 identifier, meta-data server 30 identifier, operation priority, and operation start time.

For each meta-data server, the resource information service 46 stores capacity information, including but not limited to maximum disk space and maximum number of search operations. The resource information service 46 stores the available disk space, the available number of concurrency, average CPU utilization, and record for each active search operation in the meta-data server 30. The data related to search operation contains priority of operation, and the operation start time.

The resource knowledge base 44 includes a modeler service 48 to build a graph representation of logical network topology for devices and networks in the security system. The graph contains two kinds of vertex definitions. A first type of vertex defines the sub-networks in the system. A second type of vertex represents the device on the network. The unidirectional edge between first type of vertices defines the connection from one sub-network to another. The bi-directional edge between second type of vertex and first type of vertex indicates that the device is connected to a sub-network. A device is added to the proper place in this representation when a device is registered and removed from this representation when a device is unregistered. The vertex representing the sub-network contains attributes such as subnet mask, gateway IP address, and maximum bandwidth. The maximum bandwidth is utilized in the resource selection phase to prevent the hot-spot on the network. This representation is used by network proximity matrix 50 and flow information service 52.

The resource knowledge base 44 includes a network proximity matrix 50 that allows the resource manager 32 to consider a cost of introducing a media flow which will go from one network to another network as a result of possible device allocation decisions. This cost value contributes to the score given to the candidate device if the device is not on the same network with the media source. Additionally, the cost contributes to the score if the network to which the candidate device is connected is not already receiving the media flow. For example, a monitor device 16 on the same network may receive this media flow. This matrix is dynamically configurable by the user or an application program such as a Network Manager System to influence allocation decisions made by the resource manager 32.

The flow information service 52 tracks information about active media flows in the security system. The information about an active media flow includes media flow statistics, such as format and bandwidth, source, and destinations of each active media flow. In the security system, the monitoring, recording, playback, live analysis, and archive analysis operations creates a media flow from a device to the plurality of devices. For example, the monitoring operation assigns cameras 14 to monitors 16 to display the camera image data based on a fixed or dynamic configuration. This creates a media flow from the camera site to the monitoring sites. When the periodic configuration is used, monitors 16 switch from camera to camera to scan the monitored environment. Thus, a plurality of monitors 16 may display the image data from the same camera 14. The recording operation introduces a media flow from camera 14 to multimedia recorder device 22. During this live recording, another monitor 16 may be displaying the image data from the same camera 14. The live analysis operation introduces a media flow from camera 14 to analyzer server unit 24. The archive analysis operation introduces a media flow from the multimedia recorder 22 to the analyzer server unit 24. The playback operation introduces a media flow from the multimedia recorder unit 22 to the user's terminal or IP Gateway 26 when the user is accessing the system from the Internet. Information about the media flows is utilized to determine whether an allocation of device introduces an additional media flow in the security network. If the possible device allocation requires an injection of media flow into another network, the score of the candidate device contains a penalty based on the cost value obtained from the network proximity matrix 50.

The resource manager 32 provides a rule based configuration for system users for the selection of the multimedia recorder 22 and the meta-data server 30. These rules specify the user's preference about the recording place and meta-data storage place. The rule associated with recording place associates a set of multimedia recorders 22 with a specific camera 14 or camera group. The rule related to meta-data placement associates a set of meta-data servers 30 with a specific camera group. During the resource allocation phase, the resource manager 32 uses these rules to evaluate the candidate devices. For example, when the resource manager 32 needs to allocate a multimedia recorder 22 for a recording of camera 14 output, resource manager 32 considers the available resources on the devices as well as the rule associated with the camera recording. Multimedia recorders 22 included in the rule that is associated with the requested camera 14 or camera's group receives a reward during the evaluation phase.

The RSAS 58 assigns a score to a candidate device according to the following formula:

$$S_i = W_{nc} * NCost(src, i) + W_{dpl} * DataPlacementRule(src, i) + W_{load} * (W_{bw} * BW_i + W_{ds} * DS_i + W_{conc} * Conc_i)$$

The $W_{nc}$, $W_{load}$, and $W_{dpl}$ are weights that indicate importance of each parameter. The weights may be signed or dynamically determined by user preference or network criteria. The src variable denotes the media source. The NCost (src,i) denotes the value in the network proximity matrix 50. This value is normalized ([0 . . . 1]) and if the media flow associated with the source src is already in the network on which the candidate device i is connected, then it returns 1 to denote there is no cost. The DataPlacementRule(src,i) returns 0 if the device lie not listed in the data placement rule associated with the camera src and 1 it the device i is included in the rule. The combination of $BW_i$, $DS_i$, and $Conc_i$ defines the load on the device i and each parameter is also associated with weight, $W_{bw}$, $W_{ds}$, and $W_{conc}$, respectively. The $BW_i$ denotes the ratio of available bandwidth and maximum bandwidth on device i. The $DS_i$ denotes the ratio of available disk space and maximum disk space on device i. The $Conc_i$ denotes the ratio of available concurrency and maximum concurrency of the device i. This weighted-sum formula produces a score value $S_i$ for a candidate device i. The RSAS 58 obtains the flat of candidate devices from the resource information service 50 based on the current operation and desired requirement. For example, the live recording operation requires a multimedia recorder unit 22 while the live analysis operation requires an analyzer sewer unit 24. For example, the recording request of certain camera uses MPEG-2 while another uses MPEG-4 with different bandwidth requirement. If a multimedia recorder unit 22 has trans-coding capability, the selection process checks the multimedia recorder 22 capability against the required recording format in addition to the available resources of the candidate device. When there is a possibility of introducing a media flow into a network due to the candidate device, the resource manager 32 checks the maximum bandwidth, which is obtained from the modeler service 48, for the network to ensure that the network has enough bandwidth to handle the additional media flow. After the devices that are capable of handling the requests are selected, the RSAS 58 starts assigning the score value for each candidate device.

Figure 3:
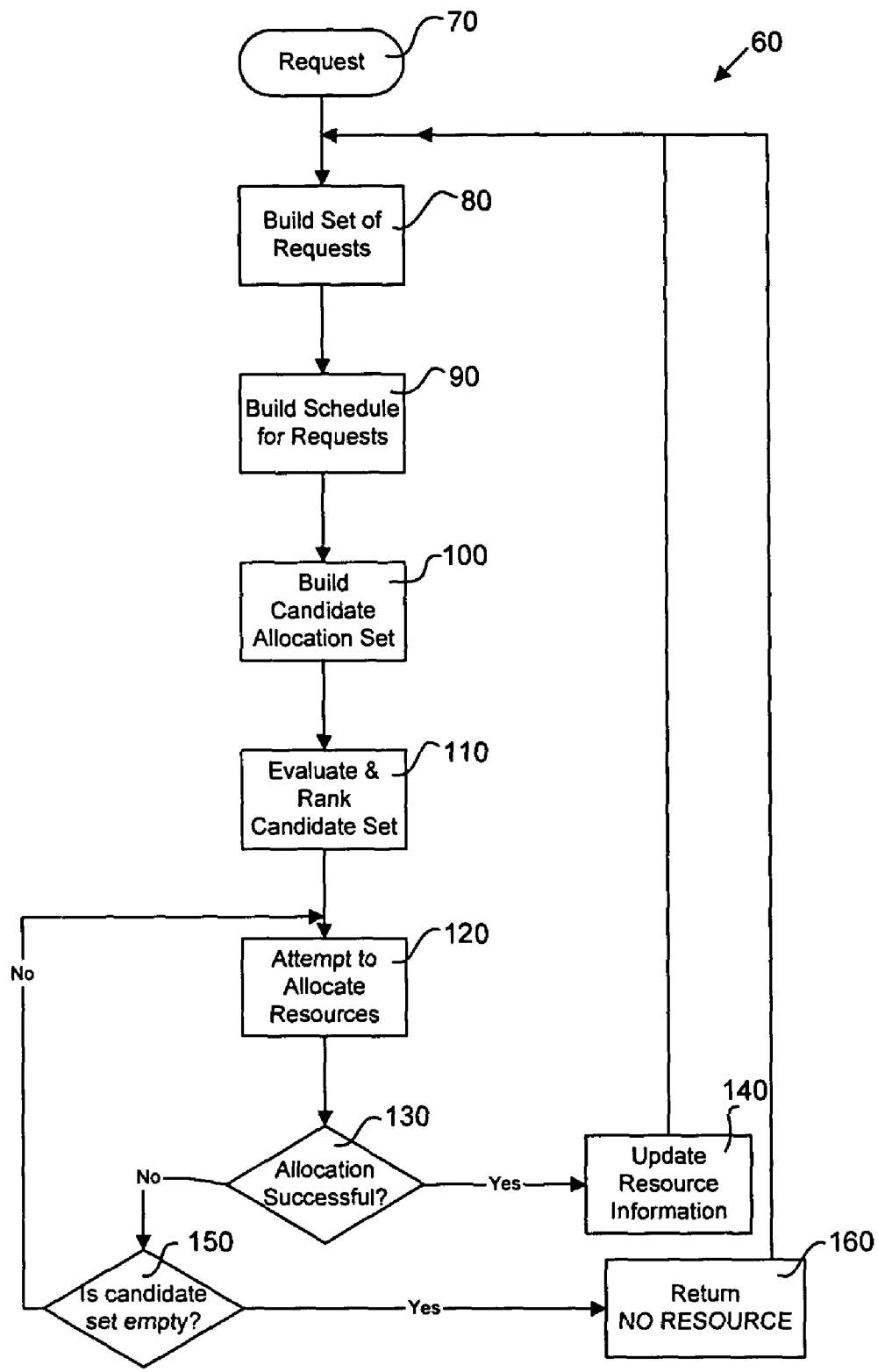
FIG. 3 is a flow diagram of a resource scheduling and allocation service according to the present invention.

The resource allocation and scheduling service (RSAS) 58 performs a resource allocation and scheduling decision algorithm 60 as shown in FIG. 3. A request queue receives and places the user requests based on the priority of submitted user requests at step 70. The RSAS 58 obtains near future requests and builds a set of requests at step 80. The set of requests includes a current request and the near future requests. The requests include information such as the desired operation, parameters of operation, and the required resources. Additionally, the requests may include the duration of the request. The duration of a request is not included in user-controlled requests. The RSAS 58 builds a schedule for the set of requests by using the current resource information and network information from the resource information base 44 at step 90. For example, the RSAS 58 interacts with the resource information service 46 to determine which devices are capable of handling the desired operation. Additionally, the RSAS 58 interacts with the flow information service 52 to determine whether there is a media flow between a particular source and destination. The RSAS 58 interacts with the network proximity matrix 50 to determine the cost of introducing a media flow from the source to the candidate destination device.

The RSAS 58 uses the schedule to build a candidate resource allocation set at step 100. The RSAS 58 then evaluates the candidate set and ranks the candidates in the set based on scores obtained. After the set of candidate devices is evaluated, the RSAS 58 attempts to allocate the resources according to the rankings at step 120. At step 130, the RSAS 58 determines if the allocation was successful. If the targeted device or server is unable to accommodate the request, the RSAS 58 attempts to allocate the next candidate device from the candidate device set. If there are no more candidate devices in the candidate device set, then the RSAS returns a no resource error to the operation request at step 160. If the device or server accepts the request, the RSAS 58 commits the device or server to the requested operation. The RSAS 58 updates the resource information in the resource information base 44 and the flow information service 48 at step 140 and restarts the algorithm at step 80 to process the next user request.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A resource manager for a security system network comprising:
   one or more devices for collecting and/or managing data from an environment;
   a flow information service storing in a computer readable medium descriptions of media flows in one or more networks, including source device and network, destination device and network, media flow type, and required bandwidth;
   one or more users that submit operation requests for the data; and
   a controller that: (1) receives at least one of the operation requests, (2) finds available and capable devices appropriate for an operation specified by a received operation request and forms a set of candidates therefrom, wherein each candidate contains one or more of the found devices based on (i) the received operation request, (ii) a description of a media flow specified in the operation request, and (iii) load characteristics of the one or more devices, (3) assigns a score to the one or more devices by using: (i) information from the load characteristics of the one or more devices and networks in a networked surveillance system, (ii) descriptions of current media flows stored by said flow information service, and (iii) dynamically configurable user preferences, where the score is a weighted function of the load characteristics, the current media flows and the user preference, and (4) allocates the one or more devices for the requested operation by selecting the one or more devices from a list of the candidates ranked according to the scores
   wherein said resource manager is a multi-user application level variable rate security video media stream application system resource manager that controls grouping of security devices according to the user preferences of multiple users to support security application flows from cameras to: (1) storage devices; (2) image processing analyzers; and (3) displays in a distributed network in which the multiple users: (a) monitor multiple displays; (b) use multiple analyzers filtering the variable rate stream; and (c) use storage devices to store the variable rate security video stream.

2. The resource manager according to claim 1 wherein the controller generates allocation requests that attempt to allocate the operation requests to the devices in response to the operation requests.

3. The resource manager according to claim 1 wherein the controller generates a graphical representation of the load characteristics.

4. The resource manager according to claim 1 wherein the load characteristics include availability of the one or more devices.

5. The resource manager according to claim 1 wherein the load characteristics include media flow data of the one or more devices.

6. The resource manager according to claim 5 wherein the media flow data includes a source identifier, a media format, a media bandwidth requirement, a multi-cast address, and a service identifier.

7. The resource manager according to claim 1 wherein the load characteristics include location of the one or more devices, availability of the devices, and current media flow of the devices.

8. The resource manager according to claim 1 wherein the one or more devices include the camera that collects multimedia data.

9. The resource manager according to claim 8 wherein the camera streams the multimedia data in one or more media formats.

10. The resource manager according to claim 8 further comprising a multimedia recorder that records the multimedia data.

11. The resource manager according to claim 10 wherein the multimedia recorder plays the multimedia data in response to the operation requests.

12. The resource manager according to claim 10 further comprising an analyzer server that collects meta-data from the multimedia data.

13. The resource manager according to claim 12 wherein the analyzer server collects the meta-data directly from the camera.

14. The resource manager according to claim 12 wherein the analyzer server collects the meta-data from the multimedia recorder.

15. The resource manager according to claim 10 further comprising a meta-data server that stores the meta-data.

16. The resource manager according to claim 15 wherein the operation requests include searching the meta-data server for meta-data.

17. The resource manager according to claim 1 wherein the operation requests include record requests, analysis requests, play requests, and search requests.

18. The resource manager according to claim 17 wherein the record requests include at least one of a source camera identifier, a media recording format, a recording purpose, and a duration of recording.

19. The resource manager according to claim 17 wherein the analysis request includes the source camera identifier and a duration of analysis.

20. The resource manager according to claim 17 wherein the analysis request includes an identity and a location of a multimedia file.

21. The resource manager according to claim 17 wherein the play request includes the identity and a location of a multimedia file.

22. The resource manager of claim 1 further comprising an Internet gateway server that connects the users to the security system network.

23. The resource manager of claim 1 wherein the controller generates a schedule for the requests based on the load characteristics.

24. The resource manager of claim 1 wherein the controller prioritizes the operation requests.

25. The resource manager of claim 1 wherein the operation requests are generated by one of the one or more users, an alarm, and a scheduled event.

26. A method for allocating resources in a security system network comprising:

collecting data from an environment at one or more network resources;

storing in a computer readable medium descriptions of media flows in one or more networks, including source device and network, destination device and network, media flow type, and required bandwidth;

submitting requests for the data from one or more users;

finding available and capable devices appropriate for an operation specified by at least one of the submitted requests and forms a set of candidates therefrom, wherein each candidate contains one or more of the found devices based on (i) the received operation request, (ii) a description of a media flow specified in the operation request, and (iii) load characteristics of the one or more devices;

assigning a score to the one or more devices by using: (i) information from the load characteristics of the one or more devices and networks in a networked surveillance system, (ii) descriptions of current media flows stored in the computer readable medium, and (iii) dynamically configurable user preferences, where the scores are assigned the following weighted sum formula:

$$S_i = W_{nc} * NCost(src, i) + W_{dpl} * DataPlacementRule(src, i) + W_{load} * (W_{bw} * BW_i + W_{ds} * DS_i + W_{conc} * Conc_i);$$

wherein $W_{nc}$, $W_{load}$, $W_{dpl}$ $W_{bw}$, $W_{ds}$, and $W_{conc}$ are weights, src denotes the media source, NCost(src,i) denotes a value in a network proximity matrix and returns a value from [0 ... 1] in which 1 denotes the most preferred and 0 denotes the least preferred, DataPlacementRule(src,i) returns 0 if a candidate device i of the one or more devices is not listed in a data placement rule associated with the camera src and 1 if the device i is included in the rule, combination of $BW_i$, $DS_i$, and $Conc_i$ defines load on the candidate device i, $BW_i$ denotes a ratio of available bandwidth and maximum bandwidth on device i, $DS_i$, denotes a ratio of available disk space and maximum disk space on device i, $Conc_i$ denotes a ratio of available concurrency and maximum concurrency of the device i, and this weighted-sum formula produces a score value $S_i$ for a candidate device i; and allocating the one or more devices for the requested operation by selecting the one or more devices from a list of the candidates ranked according to the scores.

27. The method of claim 26 wherein allocating resources includes generating a schedule for the requests based on the load characteristics.

28. The method of claim 27 wherein generating the schedule includes prioritizing the requests based on network criteria.

29. The method of claim 26 wherein allocating the one or more network resources includes determining a set of candidate devices, assigning scores to each candidate device in the set, and communicating with the candidate devices according to the scores.

30. The method of claim 29 further comprising calculating the scores according to a current load, a location on a network, and existing media flows.

31. The method of claim 26 wherein communicating with the candidate devices includes determining availability of the candidate devices.

32. The method of claim 26 wherein determining the load characteristics includes generating a graphical representation of the load characteristics.

33. The method of claim 32 wherein the graphical representation is a topographical map of the network.

34. The method of claim 33 wherein the topographical map includes indicia of networks and the one or more network resources in the security system network.

35. The method of claim 32 further comprising determining costs of allocating the one or more network resources to the requests according to the graphical representation.

36. The method of claim 35 further comprising storing the costs in a matrix.

37. The method of claim 26 further comprising generating a set of rules according to preferences of the one or more users.

38. The method of claim 37 wherein allocating the network resources includes allocating the one or more network resources according to the set of rules.

39. A resource manager for a security system network comprising:
   one or more devices for collecting and/or managing data from an environment:
   a flow information service storing in a computer readable medium descriptions of media flows in one or more networks, including source device and network, destination device and network, media flow type, and required bandwidth;
   one or more users that submit operation requests for the data; and
   a controller that: (1) receives at least one of the operation requests, (2) finds available and capable devices appropriate for an operation specified by a received operation request and forms a set of candidates therefrom, wherein each candidate contains one or more of the founds devices based on (i) the received operation request. (ii) a description of a media flow specified in the operation request, and (iii) load characteristics of the one or more devices, (3) assigns a score to the one or more devices by using: (i) information from load characteristics of the one or more devices and networks in a networked surveillance system, (ii) descriptions of current media flows stored by said flow information service, and (iii) dynamically configurable user preferences, and (4) allocates the one or more devices for the requested operation by selecting the one or more devices from a list of the candidates ranked according to the scores wherein said controller assigns scores to the one or more devices according to the following weighted sum formula:

$$S_i = W_{nc} * NCost(src, i) + W_{dpl} * DataPlacementRule(src, i) + W_{load} * (W_{bw} * BW_i + W_{ds} * DS_i + W_{conc} * Conc_i);$$

wherein $W_{nc}$, $W_{load}$, $W_{dpl}$ $W_{bw}$, $W_{ds}$, and $W_{conc}$ are weights, src denotes the media source, NCost(src,i) denotes a value in a network proximity matrix and returns a value from [0 . . . 1] in which 1 denotes the most preferred and 0 denotes the least preferred, DataPlacementRule(src,i) returns 0 if a candidate device i of the one or more devices is not listed in a data placement rule associated with the camera src and 1 if the device i is included in the rule, combination of $BW_i$, $DS_i$, and $Conc_i$ defines load on the candidate device i, $BW_i$ denotes a ratio of available bandwidth and maximum bandwidth on device i, $DS_i$ denotes a ratio of available disk space and maximum disk space on device i, $Conc_i$ denotes a ratio of available concurrency and maximum concurrency of the device i, and this weighted-sum formula produces a score value $S_i$ for a candidate device i.

40. The resource manager of claim 39, wherein the weights are user configurable.

41. The resource manager of claim 39, wherein said resource manager is a multi-user application level variable rate security video media stream application system resource manager that controls grouping of security devices according to the user preferences of multiple users to support security application flows from cameras to: (1) storage devices; (2) image processing analyzers; and (3) displays in a distributed network in which the multiple users: (a) monitor multiple displays; (b) use multiple analyzers filtering the variable rate stream; and (c) use storage devices to store the variable rate security video stream.

* * * * *